US012600014B2

(12) United States Patent
Shimizu et al.

(10) Patent No.: US 12,600,014 B2
(45) Date of Patent: Apr. 14, 2026

(54) METHOD AND APPARATUS FOR HOLDING SUBSTRATE

(71) Applicant: ORC MANUFACTURING CO., LTD., Tokyo (JP)

(72) Inventors: Shuichi Shimizu, Tokyo (JP); Fumiya Suzuki, Tokyo (JP)

(73) Assignee: ORC MANUFACTURING CO., LTD., Tokyo (JP)

( * ) Notice: Subject to any disclaimer, the term of this patent is extended or adjusted under 35 U.S.C. 154(b) by 7 days.

(21) Appl. No.: 18/817,909

(22) Filed: Aug. 28, 2024

(65) Prior Publication Data

US 2025/0360601 A1 Nov. 27, 2025

(30) Foreign Application Priority Data

May 21, 2024 (JP) ................................ 2024-082722

(51) Int. Cl.
*B25B 11/00* (2006.01)

(52) U.S. Cl.
CPC ................................ *B25B 11/005* (2013.01)

(58) Field of Classification Search
CPC ....... B25B 11/005; H01L 21/67; H01L 21/68; H01L 21/673; H01L 21/683; H01L 21/6838; H01L 22/12; B23P 19/00; B23P 19/04
See application file for complete search history.

(56) References Cited

U.S. PATENT DOCUMENTS

| | | | | | |
|---|---|---|---|---|---|
| 5,564,682 | A * | 10/1996 | Tsuji | H01L 21/6838 269/21 |
| 9,459,541 | B2 | 10/2016 | Hirano | |
| 11,572,299 | B2 * | 2/2023 | Gier | B32B 17/10036 |
| 11,728,204 | B2 * | 8/2023 | Verstreken | B25B 11/005 269/21 |
| 11,894,256 | B2 * | 2/2024 | Takahara | H01L 21/6838 |
| 2018/0247854 | A1 * | 8/2018 | Matsuoka | C23C 14/505 |
| 2019/0203373 | A1 * | 7/2019 | Fujikata | H01L 21/67288 |
| 2020/0109076 | A1 * | 4/2020 | Gier | C03B 23/0235 |
| 2021/0247178 | A1 * | 8/2021 | Zeng | G01B 11/306 |
| 2022/0157641 | A1 | 5/2022 | Takahara et al. | |
| 2022/0250168 | A1 * | 8/2022 | Nishri | H01L 21/67288 |

FOREIGN PATENT DOCUMENTS

| | | |
|---|---|---|
| JP | 4105613 | 6/2008 |
| JP | 2011-81156 | 4/2011 |
| JP | 6087669 | 3/2017 |
| JP | 6516664 | 5/2019 |
| JP | 2022-79225 | 5/2022 |

* cited by examiner

*Primary Examiner* — Sarang Afzali
*Assistant Examiner* — Darrell C Ford
(74) *Attorney, Agent, or Firm* — Greenblum & Bernstein, P.L.C.

(57) ABSTRACT

An apparatus for holding a substrate includes a table, a lifting and lowering mechanism configured to mount a substrate on the table, and at least one pressing member configured to press the substrate to the table from the peripheral side of the substrate, in which the pressing member is movable upward and downward. The apparatus further includes at least one detector configured to detect a warp of the substrate mounted on the table from a peripheral side of the substrate, and a controller configured to control a movement of the pressing member in accordance to the detected warp.

5 Claims, 6 Drawing Sheets

METHOD AND APPARATUS FOR HOLDING SUBSTRATE

BACKGROUND OF THE INVENTION

1. Field of the Invention

The present invention relates to a substrate holder, especially, a mechanism for holding a substate.

2. Description of the Related Art

A substrate holder is provided with a substrate processing unit such as an exposure unit, a laser processing unit, a coating unit, etc. The substrate holder is equipped with a mechanism that holds a substrate carried from another unit and fixes or secures the carried substrate on a table during the process. For example, an exposure unit has a vacuum chucking mechanism in a table. A substrate mounted on the table is sucked by vacuum suction to fix the substrate on the table. Similarly, a laser processing unit that forms a pattern such as a via hole in a substrate has a substrate holder with a vacuum chucking function.

Generally, the edge of a substrate is warped upward or downward due to thermal deformation. For the entire warped substrate to make contact with a table tightly, a plurality of plate-shaped holding members is arranged around the peripheral section of the substrate. Each holding member depresses the substrate to fasten the substrate to the table.

Takahara et al. (US 2022/0157641A1) discloses a substrate holder with a plurality of holding members. Each holding member has a protrusion that makes contact with the end surface of the substrate to correct a position of the substrate. Thus, a slip of the substrate is suppressed when mounting the substrate on the table.

There are various substrates that can differ in terms of size, material, strength, warp characteristics and even durability to thermal conditions. The holding members disclosed in Takahara et al. press the substrate downward and toward a center point of the substrate, which puts an excessive load on the substrate.

SUMMARY OF THE INVENTION

This invention is an improvement of an apparatus and method for holding a substrate.

An Apparatus for holding a substrate according to one aspect of the present invention includes a table, a lifting and lowering mechanism configured to mount a substrate on the table, at least one pressing member configured to be movable upward and downward and press the substrate toward the table from the peripheral side of the substrate, at least one detector configured to detect a warp of the substrate mounted on the table from the peripheral side of the substrate, and a controller configured to control a movement of the pressing member in accordance to the detected warp.

An Apparatus for holding a substrate according to another aspect of the present invention includes a table, a lifting and lowering mechanism configured to mount a substrate on the table, at least one pressing member configured to being movable upward and downward and press the substrate toward the table from the peripheral side of the substrate, at least one detector configured to detect a warp of the substrate mounted on the table, and a controller configured to control a movement of the pressing member, the controller changing a starting position of the pressing member for pressing the substrate in accordance to the content of the warp.

A method for holding a substrate according to another aspect of the present invention includes the steps of: a) mounting the substrate on a table by a lifting and lowering mechanism, b) detecting a warp of the substrate mounted on the table from the peripheral side of the substrate based on the emission and absorption of light, c) pressing the substrate toward the table from the peripheral side of the substrate by a pressing member configured to be movable upward and downward, and d) controlling the movement of the pressing member in accordance to the detected warp.

A method for holding a substrate according to another aspect of the present invention includes the steps of: a) mounting the substrate on a table by a lifting and lowering mechanism, b) detecting a warp of the substrate mounted on the table based on the emission and absorption of light, c) pressing the substrate toward the table from the peripheral side of the substrate by a pressing member configured to be movable upward and downward, d) controlling the movement of the pressing member in accordance to the detected warp, and e) changing a starting position of the pressing member for pressing the substrate in accordance to a content of the warp.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with references to the attached drawings.

Figure 1:
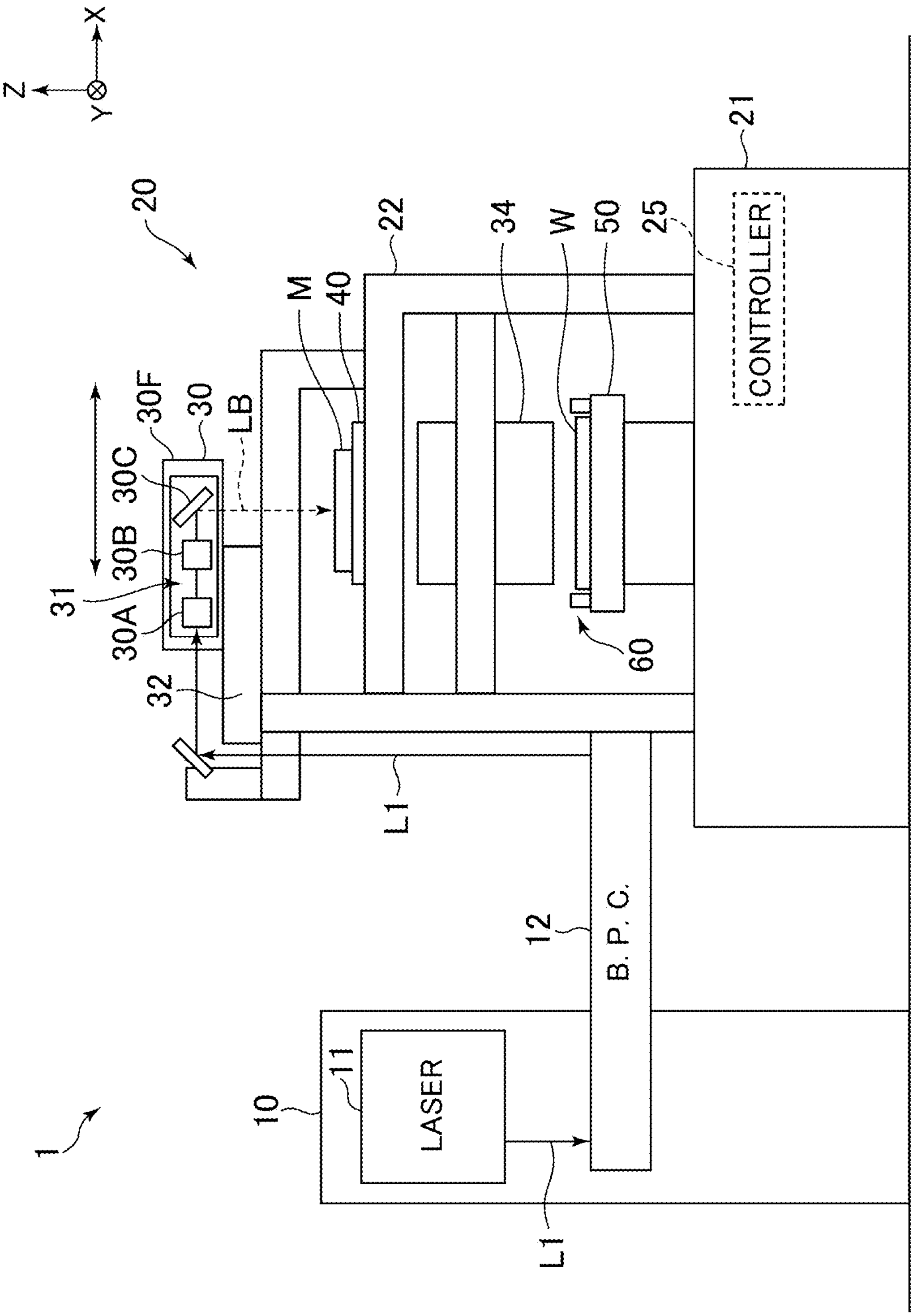
FIG. 1 is a schematic view of a laser processing unit according to the first embodiment.

FIG. 1 is a schematic view of a laser processing unit according to the first embodiment.

The laser processing unit 1, which forms a pattern on a substrate W by laser ablation, is equipped with a light source unit 10 and a unit body 20. The light source unit 10 is equipped with a laser 11 that oscillates a laser beam L1 with high energy density. Herein, the laser 11 is an excimer laser that emits a KrF excimer laser beam with the wavelength of 248 nm per pulse. The emitted laser beam L1 is directed to the unit body 20 via a beam position corrector 12 having a mirror.

The unit body 20 is equipped with an optical device 30, illumination optical system 31, a projection optical system 34, a mask stage 40 and a processing stage 50. The optical device 30 and the projection optical system 34 are mounted to a stand 22 fixed to a base 21. The illumination optical system 31 is equipped with a lens array 30A, a line-beam forming optical system 30B, and a mirror 30C, which are contained in a casing 20K. The illumination optical system 31 delivers a uniform intensity laser beam L1 and forms a line-shaped laser beam LB. The line-shaped laser beam LB is directed to the mask stage 40 via the mirror 30C.

A mask M is placed on the mask stage 40. Mask patterns such as interstitial via hole, blind via hole, wiring groove (trench), etc., are formed on the mask M. The line-shaped laser beam (hereinafter, called a "line-beam") LB passes through the mask M and enters the projection optical system 34 as a light pattern. The projection optical system 34 focuses the line-beam LB on the surface of the substrate W mounted on the processing stage 50. A plurality of processed areas is regularly defined on the substrate W and X-Y-Z coordinates perpendicular to one another are defined on the mask stage 40 and the processing stage 50.

A scanner 32, which is opposite and links to the casing 30F of the optical device 30, is movable along the X direction. The scanner reciprocates the optical device 30 along the X direction to scan the line-beam LB along the X direction. Thus, a pattern corresponding to the mask pattern on the mask M is formed on a processed area of the substrate W.

The processing stage 50 is movable along the main-scanning direction (X direction) and the sub-scanning direction (Y direction) wherever a processing pattern is formed on each processed area. The processing stage 50 moves along the X direction and Y direction by a step & repeat method when a pattern is formed on a processed area on the substrate W. Thus, a laser ablation process is applied to the entire substrate W.

A substrate holder 60 is provided in the processing stage 50. The substrate W is transferred by a conveyer (not shown) and is mounted on the processing stage 50 by the substrate holder 60. After the laser ablation is terminated, the conveyer ejects the substrate W and transfers a different substrate W to be processed next onto the processing stage 50.

A controller 25 controls the laser processing unit 1 and outputs control signals to the scanner 32 and the substrate holder 60, etc. The substrate holder 60 holds the substrate W and fixes the substrate W to the processing stage 50.

Figure 2:
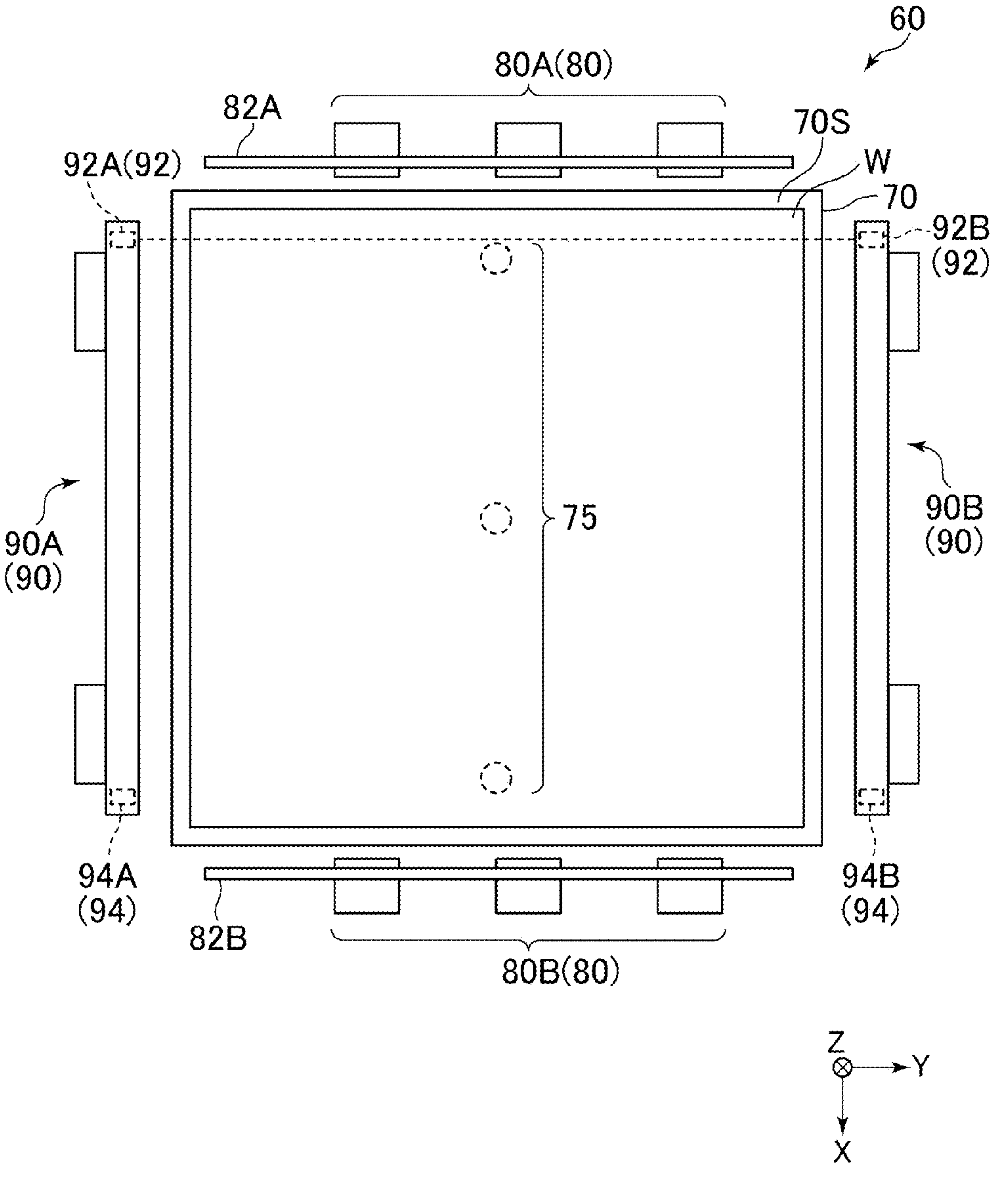
FIG. 2 is a plan view of a substrate holder seen from above.

FIG. 2 is a plan view of the substrate holder 60 seen from above.

The substrate holder 60 is equipped with a table 70, a clamp mechanism 80, and a lifting and lowering mechanism 90. The rectangular table 70 supports the substrate W on a supporting surface 70S and serves as a vacuum chuck mechanism. Concretely, a plurality of lifting pins 75 (in FIG. 2, three pins) is capable of ascending and descending along the Z direction (vertical direction) and are arrayed at given intervals along the centerline in the Y direction of the table 70.

The clamp mechanism 80 and the lifting and lowering mechanism 90 are provided around the table 70. The clamp mechanism 80 has a pair of fixing members 80A and 80B, which are opposite to one another along the X direction via the supporting surface 70S. The lifting and lowering mechanism 90 has a pair of lifters 90A and 90B, which are opposite to one another along the Y direction via the supporting surface 70S.

The fixing members 80A and 80B are rotatable around axes 82A and 82B, respectively, and press the substrate W toward the table 70 in a state in which the substrate W is mounted on the table 70. Herein, the fixing members 80A and 80B have three fixing plates, respectively.

The lifters 90A and 90B in the lifting and lowering mechanism 90 are movable along the Z direction and place the substrate W on the supporting surface 70S of the table 70 while supporting the carried substrate W. When the laser ablation of the substrate W is finished, the lifters 90A and 90B ascend to separate the substrate W from the supporting surface 70S.

Furthermore, the lifters 90A and 90B are movable along the Y direction in addition to the Z direction and function as pressing members that press the substrate W toward the supporting surface 70S from the top surface of the substrate W.

Sensors 92 and 94, which are provided on the lifters 90A and 90B, detect a warp of the substrate W (hereinafter, called "warp-detecting sensors"). The warp-detecting sensors 92 and 94 are herein photosensors that have a light emitter 92A and a light receiver 92B, which are opposite to one another via the supporting surface 70S of the table 70. The warp-detecting sensor 94 also has a light emitter 94A and a light receiver 94B.

FIGS. 3A to 3F are diagrams illustrating steps of a mounting and fixing process. FIG. 4. is a flowchart of the mounting and fixing process. FIGS. 5A to 5C are diagrams illustrating steps of a warp-detecting process.

Figure 3A:
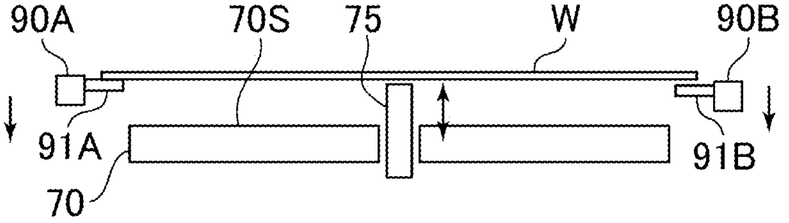
FIGS. 3A to 3F are diagrams illustrating steps of a mounting and fixing process.
Figure 4:
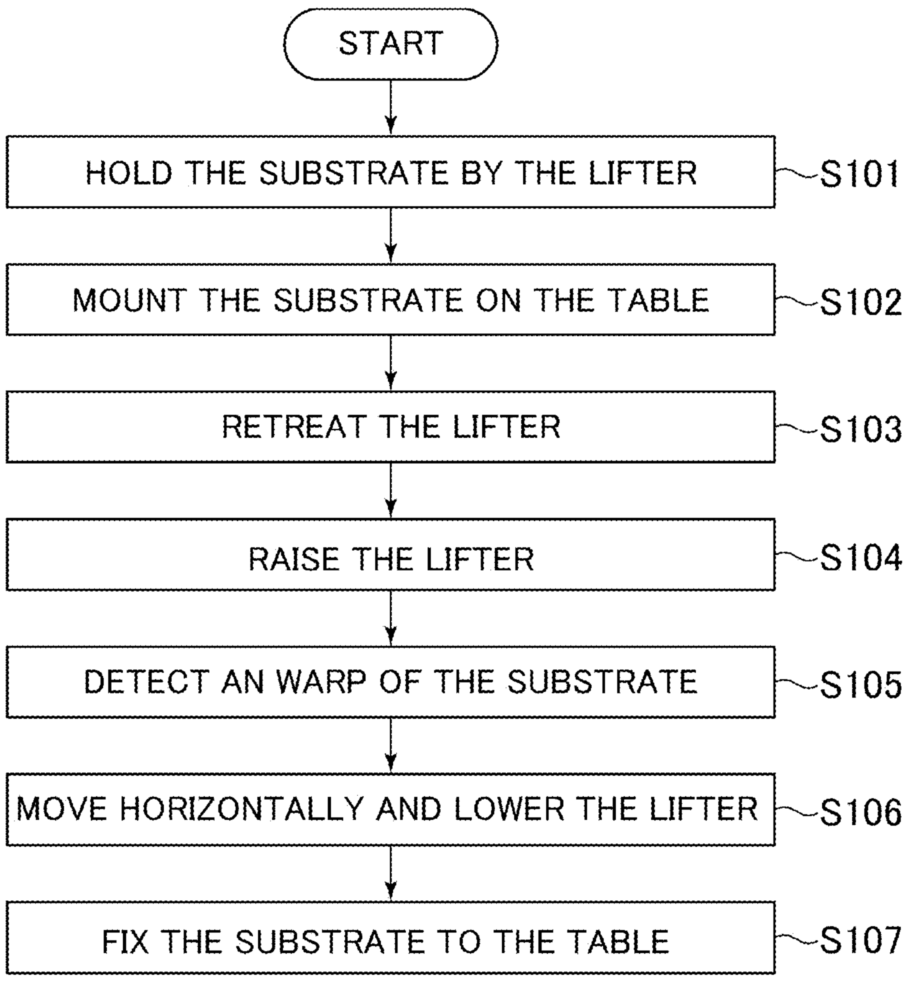
FIG. 4. is a flowchart of a mounting and fixing process.
Figure 5A:
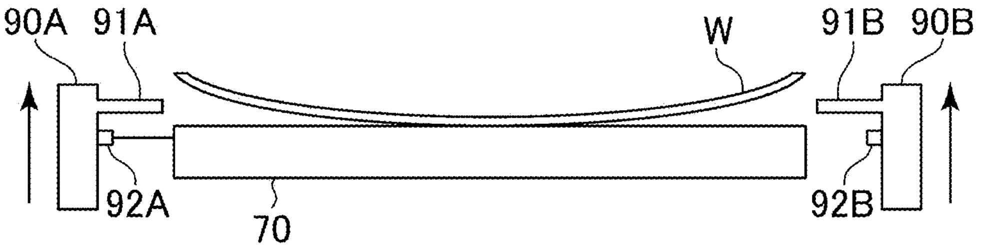
FIGS. 5A to 5C are diagrams illustrating steps of a warp-detecting process.
Figure 5B:
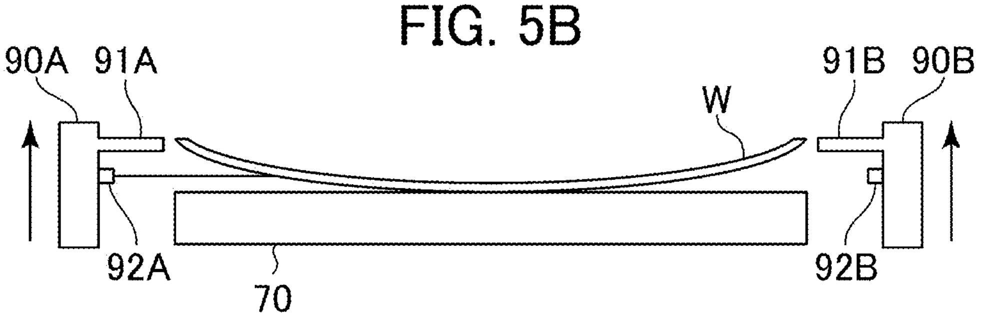
Figure 5C:
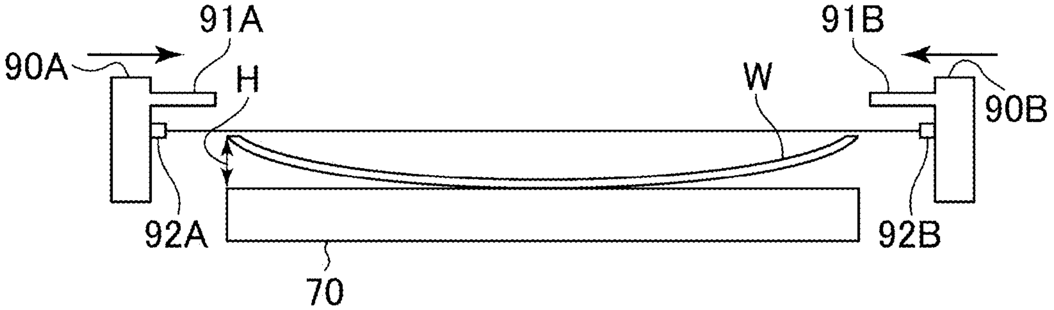

The lifters 90A and 90B in the lifting and lowering mechanism 90 receive and support the substrate W together with the lifting pins 75 as the substrate W is conveyed to the laser processing unit 1 by the conveyer (FIG. 3A and Step 101 in FIG. 4). The lifters 90A and 90B have plates 91A and 91B, respectively, each of which has both a supporting surface, which extends along the Y direction and supports the bottom surface of the substrate W, and a pressing surface, which presses the top surface of the substrate W downward.

Figure 3B:
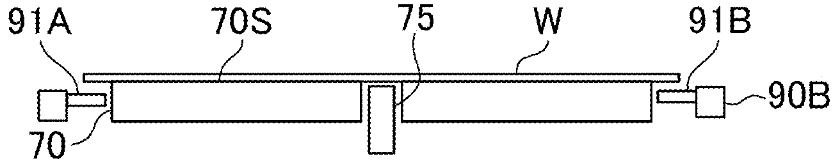
Figure 3C:
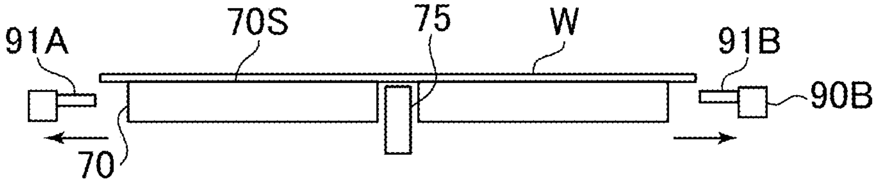
Figure 3D:
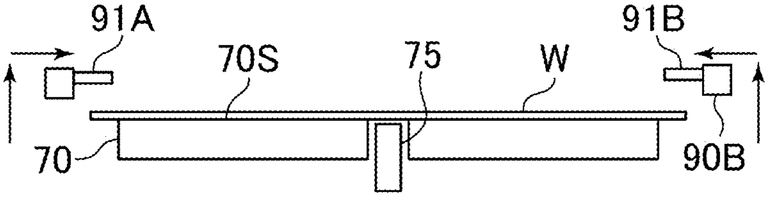

The lifters 90A and 90B descend along the Z direction with the lifting pins 75 while supporting the substrate W by the plates 91A and 91B. The lifters 90A and 90B retreat to a given position along the Y direction after the substrate W reaches the supporting surface 70S and the plates 91A and 91B leave the bottom surface of the substrate W (FIGS. 3A and 3B; and S102 and S103 in FIG. 4). Then, the lifters 90A and 90B ascend. In the warp detecting sensors 92 and 94, light is emitted from the light emitter 92A when the lifters 90A and 90B start ascending (FIG. 3D and S104 in FIG. 4). The light emitter 92A herein emits a laser beam.

As shown in FIG. 5A, the substrate W is warped due to factors such as thermal deformation. Herein, the substrate W is curved upward and the height from the supporting surface 70S is designated as "H". Since the light emitter 92A and the light receiver 92B are opposite one another and are positioned below the plates 91A and 91B, respectively, light emitted from the light emitter 92A is reflected off the substrate W and does not reach the light receiver 92B after the lifters 90A and 90B start ascending (See FIGS. 5A and 5B).

When the lifters 90A and 90B continue ascending and the positions of the warp-detecting sensors 92 and 94 suppress the height "H" of the warp of the substrate W, light emitted from the light emitters 92A and 94A reaches the light receivers 92B and 94B, respectively, which allows the warp-detecting sensors 92 and 94 to detect the content of the warp, e.g., the height "H" (S105 in FIG. 4).

The controller 25 suspends the raising of the lifters 90A and 90 B in response to a signal detected from the warp-detecting sensors 92 and 94. The lifters 90A and 90B are paused at a position where the bottom surface of the plates 91A and 91B is higher than the height "H" of the warp of the substrate "W". The paused position of the lifters 90A and 90B is regarded as a starting position for a pressing operation carried out by the controller 25. In the pressing operation, the controller 25 moves the lifters 90A and 90B to a given position along the Y direction so that the lifters 90A and 90B approach the substrate W.

Figure 3E:
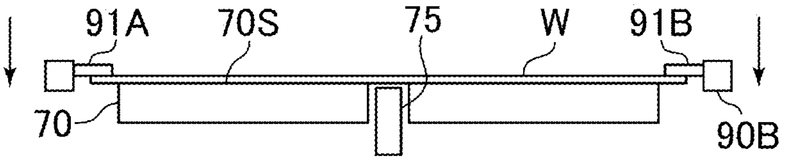

The controller 25 then lowers the lifters 90A and 90B so that the plates 91A and 91B press the substrate W downward (See FIGS. 3D and 3E; Steps 106 and 107 in FIG. 4). Accordingly, the clamp mechanism 80 rotates and presses the substrate W downward, and a vacuum suction process is carried out to fix the substrate W to the table 70.

With respect to the lifters 90A and 90B, no part makes contact with the substrate W while the substrate W is depressed, except for the plates 91A and 91B. In other words, the lifters 90A and 90B do not have any protrusions that come into contact with the end surface of the substrate W and press the substrate W toward the center point of the substrate W during the pressing operation.

Figure 3F:
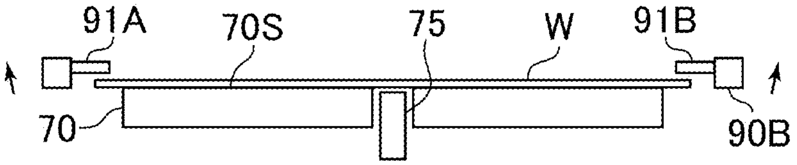

After the laser ablation is terminated, the lifters 90A and 90B retreat to given positions and descend, respectively (FIG. 3F). The vacuum suction is released and the lifters 90A and 90B ascend while supporting the bottom surface of the substrate W, respectively. Consequently, the substrate W moves away from the table 70. Note that the lifters 90A and 90B may retreat to the given position before the laser ablation.

In this way, the lifting and lowering mechanism 90 provided in the laser processing unit 1 is equipped with the lifters 90A and 90B having the warp-detecting sensors 92 and 94. After the substrate W is mounted on the table 70, the warp-detecting sensors 92 and 94 detect the warp at the edges of the substrate W as the lifters 90A and 90B ascend upward to depress the substrate W. Then, the controller 25 suspends the lifters 90A and 90B at the position where an amount of warp is detected, and carries out the pressing operation, i.e., moves the lifters 90A and 90B along the Y direction and lowers the lifters 90A and 90B along the Z direction.

For example, when the substrate W is a glass plate, a vacuum suction with a depression of the substrate W causes an increase in the load on the substrate W when the warp W is relatively great. However, since the warp of the substrate W is detected from the peripheral side of the substrate W by using the warp-detecting sensors 92 and 94, the controller 25 can carry out the pressing operation while matching the timing of the pressing with the vacuum suction. Consequently, the substrate W is placed on a proper position on the table 70 without pressing the side surface of the substrate W toward the center point, and a load to the substrate W is decreased during the pressing operation. Especially, since the warp-detecting sensors 92 and 94 are placed at the circumference of the substrate W and detect the warp of the substrate W in a state that the substrate W is mounted on the table 70, the content of the warp (the height "H") can be detected accurately.

The rate of descension of the lifters 90A and 90B is restricted to suppress a load that occurs when the lifters 90A and 90B make contact with the substrate W. Such a restriction of the speed decreases throughput. In this embodiment, when light emitted from the light emitters 92A and 94A is detected by the light detectors 92B and 94B, the lifters 90A and 90B are suspended simultaneously. The lifters 90A and 90B do not ascend excessively. Thus, throughput is maintained even though the speed of the lifters 90A and 90B is suppressed.

Furthermore, the warp-detecting sensors 92 and 94 are attached to the lifters 90A and 90B below the plates 91A and 91B, respectively, and detect the warp of the substrate W as the lifters 90A and 90B ascend. Thus, throughput is maintained even though the lifters 90A and 90B carry out the mounting and depressing operation.

The warp-detecting sensors 92 and 94 detect the warp of the substrate W, i.e., the height "H" of the warp from the table 70 by emitting and receiving light, instead of a measurement of an actual value of the warp. An instrument such as a laser interferometer is not utilized. The controller 25 can suspend ascending the lifters 90A and 90B without a calculation of the amount of warp, which allows the lifters 90A and 90B to start descending from a proper position. Such an effective detection of the warp of the substrate W can be made by the simple and compact warp-detecting sensors 92 and 94 and the controller 25 can easily control the movement of the lifters 90A and 90B.

The warp-detecting sensors 92 and 94 may be provided in the lifting and lowering mechanism independent of the lifters 90A and 90B. In this case, the warp-detecting sensors 92 and 94 are raised and lowered with the movement of the lifting and lowering mechanism 90. For example, the warp-detecting sensors 92 and 94 ascend and descend to the table 70 and detect the warp of the substrate W from the peripheral side of the substrate W.

The warp-detecting sensors 92 and 94 may detect the warp of the substrate W from a direction other than the end side of the substrate W, e.g, from the upper side or in the diagonal direction. For example, a laser interferometer is placed above or around the substrate W and a laser beam is scanned to detect the warp of the periphery of the substrate W.

An imaging sensor may be applied to detect the warp of the substrate W. A value of the warp may by calculated. The controller 25 can determine the starting point of the lifters 90A and 90B in accordance to the calculated warp.

Pressing members for pressing the substrate W during vacuum suction may be provided in the lifting and lowering mechanism 90 separately from the lifters 90A and 90B. Furthermore, a mechanism for mounting the substrate W on the table 70 and a mechanism for separating the substrate W from the laser processing unit 1 may be provided independently.

Figure 6:
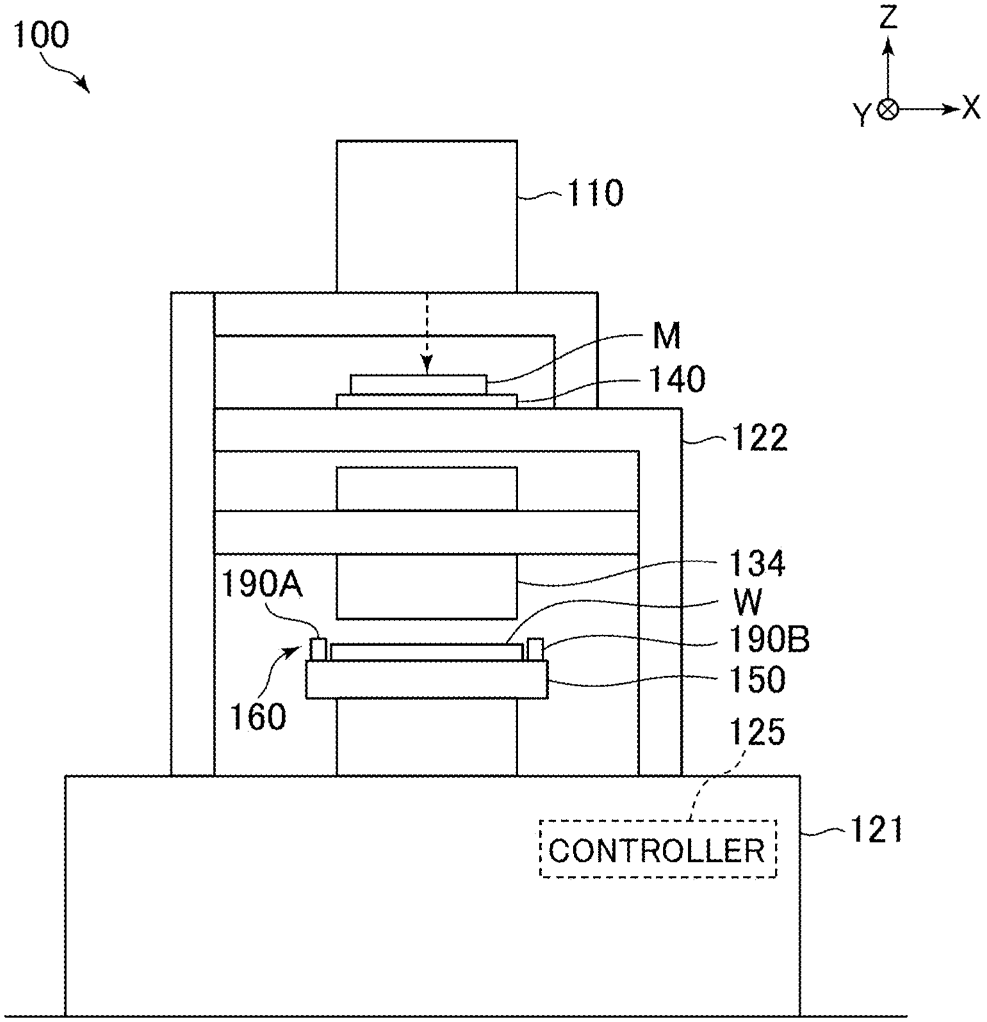
FIG. 6 is a schematic view showing an exposure unit according to a second embodiment.

Next, an exposure unit with a lifting and lowering mechanism is explained with reference to FIG. 6. FIG. 6 is a schematic view of the exposure unit.

The exposure unit 100 is a mask exposure unit and is equipped with a light source unit 110, a projection optical system 134, a mask state 140, and a processing stage 150. A stand 122 is mounted on a base 121 and a controller 125 controls an exposure process. A substrate holder 160 is provided in the processing stage 150 and lifters 190A and 190B are opposite one another.

The lifter 190A has a warp-detecting sensor, which is equipped with a light emitter and a light receiver. Light emitted from the light emitter is reflected off the substrate W and reaches the light receiver until the lifters 190A and 190B ascend and reach the height "H" of the warp. When the lifters 190A and 190B exceed the height "H" of the warp, light emitted from the light emitter travels above the substrate W so that the light receiver does not accept the light. The controller 125 determines the position of the lifters 190A and 190B as a starting position of the pressing operation.

The substrate holder explained above may be incorporated into another exposure unit such as a contact exposure unit or a maskless exposure unit that processes a silicon wafer, printed wiring board, a glass substrate, etc. Furthermore, the substrate holder may be incorporated into a unit associated with a semiconductor such as a coating unit, polishing unit, etching unit, etc. On the other hand, the substrate holder may be an independent unit and collaborate with the unit associated with the semiconductor.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2024-082772 (filed on May 21, 2024), which is expressly incorporated herein by reference, in its entirety.

The invention claimed is:

1. An apparatus for holding a substrate, comprising:

a table;

a lifting and lowering mechanism configured to mount a substrate on said table;

at least one pressing member configured to press the substrate toward said table from a peripheral side of the substrate, said pressing member being movable upward and downward;

at least one detector configured to detect a warp of the substrate mounted on said table from the peripheral side of the substrate; and a controller configured to control a movement of said pressing member in accordance to the detected warp wherein, in a state in which the substrate is mounted on said table, said detector is further configured to ascend or descend.

2. The apparatus according to claim 1, wherein said controller is further configured to change a starting position of said pressing member for pressing the substrate in accordance to the content of the warp.

3. The apparatus according to claim 1, wherein said detector comprises:

a light emitter configured to emit light along a supporting surface of said table; and a light receiver configured to receive light, said light emitter and said light receiver being arranged adjacent to a periphery of the substrate, said light emitter being opposite to said light receiver.

4. The apparatus according to claim 1, wherein said detector comprises:

a light emitter configured to emit light along a supporting surface of said table; and a light receiver configured to receive light reflected off the substrate, said light emitter and said light receiver being arranged adjacent to a periphery of the substrate.

5. An apparatus for holding a substrate, comprising:

a table;

a lifting and lowering mechanism configured to mount a substrate on said table;

at least one pressing member configured to press the substrate toward said table from a peripheral side of the substrate, said pressing member being movable upward and downward;

at least one detector configured to detect a warp of the substrate mounted on said table from the peripheral side of the substrate; and a controller configured to control a movement of said pressing member in accordance to the detected warp, wherein said detector is further configured to ascend or descend along with said pressing member, and said detector is further configured to detect the warp of the substrate as said lifting and lowering mechanism ascends upward.

* * * * *